Oct. 22, 1929.                A. W. RICHES                1,732,534
LIGHT SHIELD
Filed Feb. 6, 1926
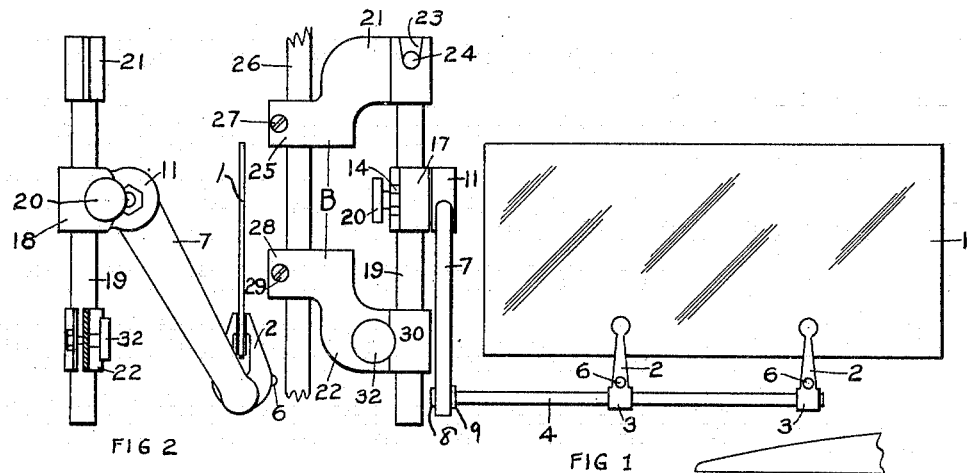
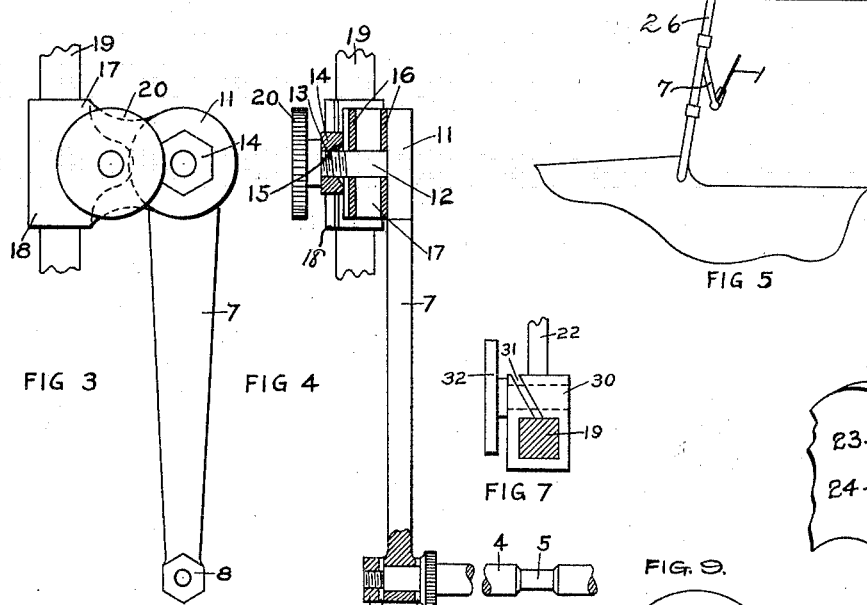
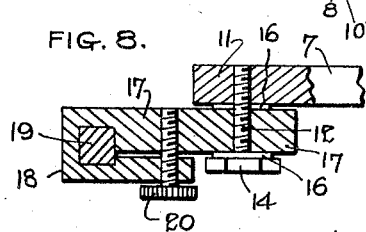
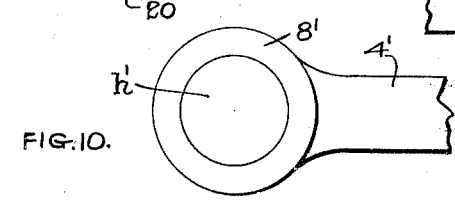
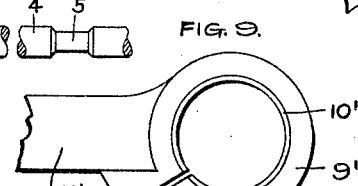
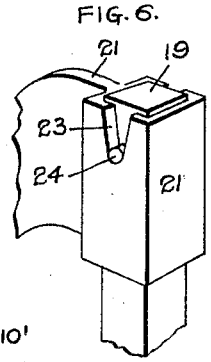
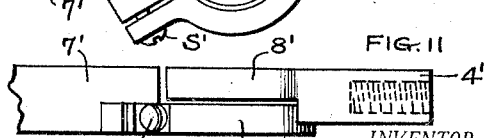
INVENTOR.
A. W. RICHES
BY Fred H Hayn
ATTORNEY.

Patented Oct. 22, 1929

1,732,534

UNITED STATES PATENT OFFICE

ARTHUR W. RICHES, OF LOS ANGELES, CALIFORNIA

LIGHT SHIELD

Application filed February 6, 1926. Serial No. 86,411.

My invention relates to devices adapted to be supported by a novel form of bracket, and more particularly to a device adapted to be positioned on a motor or other vehicle, or conveyance, so that all objectionable light rays or glare may be effectively prevented from reaching the eyes of the occupants of said vehicle or other conveyance both by day and by night.

As is well known, it is a common experience of motorists to become blinded by the rays of the sun when travelling by day, and by the glare of head lights or other lights when travelling by night, frequently causing serious accidents. It accordingly is an object of my invention to provide a novel form of device or appliance associated in any preferred manner with a motor or other vehicle, or other conveyance, such as a motor boat or aeroplane, which device or appliance may be adjusted in all directions, upwardly, downwardly or sideways, so that all the hereinbefore mentioned objectionable light rays may effectively be prevented from reaching the eyes of the occupants of said vehicle or conveyance.

A further object of my invention is to provide a novel form of shield, preferably constructed of a transparent material, such as colored glass or the like, which material is adapted to cut out objectionable glare or light rays, it being preferred that the occupants of the vehicle with which said shield is associated will not look through the same, though if desired they may do so.

It is also an object of my invention to provide a novel form of bracket adapted to be removably and adjustably associated with some sort of support, such as the windshield of a motor or other vehicle or conveyance, said bracket being adapted to support a light ray shield by means of a set of appliances whereby said shield may not only be removed bodily from said bracket, but may be positioned in all directions relative to said bracket so that objectionable light rays or glare coming from any angle may effectively be prevented from reaching the eyes of the occupants of the vehicle.

A furthr object of my invention is to provide a novel form of device which is simple in character, easy and inexpensive to manufacture, composed of a minimum number of parts, not easy to get out of order, and one which will thoroughly and reliably effect the objects intended.

Further objects and advantages of my invention will become more apparent as the description thereof proceeds.

Reference is had to the accompanying drawings, in which similar reference characters denote similar parts. In the drawings, Fig. 1 is a front elevational view showing my invention applied to a support, Fig. 2 is a part sectional and part side view of Fig. 1, Fig. 3 is an enlarged fragmentary detail elevation of the arm associated with my device whereby said device may be adjusted and moved in all directions, Fig. 4 is a part sectional and part side view of Fig. 3, Fig. 5 is a fragmentary side elevational view of a motor vehicle having my invention associated therewith, Fig. 6 is a fragmentary perspective detail view of Fig. 1, Fig. 7 is an enlarged fragmentary cross-sectional view of the lower clamping element or device depicted in Fig. 1, Fig. 8 is a fragmentary horizontal transverse sectional view through the clamping device for adjusting the light shield, and Figs. 9, 10 and 11 are respectively fragmentary plan and side elevational detail views of a modified form of joint for permitting a universal movement of the light shield.

Describing my invention more in detail, it is the principal object of my invention to provide a novel form of device, positioned either inside or outside the windshield of a motor or other vehicle, but preferably inside of said vehicle, so that said device may be adjusted to such a position that all objectionable light rays or glare may effectively be prevented from reaching the eyes of the occupants of said vehicle, it being optional to look through said device, or merely position the same in such a manner that said light rays or glare may not reach the eyes of said occupants. By positioning the device inside the vehicle, it of course is unnecessary to reach outside thereof for adjusting purposes.

My invention consists of a shade, or a means for shutting off the effect of objectionable light rays or glare, and a novel means for adjustably supporting the same on any convenient support, said shade or shield and said supporting means having associated therewith a set of appliances whereby said shade or shield may be adjusted in all directions relative to said supporting means.

As indcated at 1, the shade or shield is preferably, though not necessarily, rectangular in form, and preferably formed of a transparent material such as colored glass, though if desired, may be constructed of opaque material, since primarily it is not intended that the users thereof shall look therethrough, though if desired this may be done.

As a means for supporting the shield 1, I provide a set of clamping members 2, which members, if desired, may be equipped with a suitable cushioning means in the shape of felt or other washers, to prevent the glass from beng subjected to shocks or vibration so that it may not be fractured. As seen more particularly in Fig. 2, the clamps 2 preferably comprise a pair of complementary members between which the shield 1 is positioned, said clamps being cut away as shown to accommodate said shield, a cylindrical or other shape portion 3 surrounding a shaft or other support 4, equipped with reduced portions 5, so that all slippage or movement, due to vibration or shocks, may effectively be prevented, any form of adjustable fasteners 6, in the shape of an ordinary screw, wing nut and bolt connection, or a bolt provided with a knurled head, being used to hold the parts of the clamps in securing an adjustable relation.

The shaft or support 4 is adjustably associated wtih an arm 7, as more particularly shown in Fig. 4, said adjusting means preferably comprising a screw nut 8 screwed on a reduced end of the shaft 4, a knurled sleeve 9 screwed onto said shaft being used for securing and adjusting purposes. If desired, a pair of felt or fiber washers 10 may be positioned on the shaft 4, and on both sides of the arm 7, for the purpose of taking up any wear, which washers may be replaced from time to time.

The other end of the arm 7 is equipped with a U-shaped clamping and adjusting means designated generally by the reference numeral 18, whereby the arms 7 may be adjusted in all directions with the bracket depicted on Fig. 1, and indicated in a general manner by the reference character B. The arm 7 has secured thereto, or associated therewith in any preferred manner, a short stub shaft 12, equipped with screw threads 13 adapted to be engaged by the threads of a nut 14, preferably, though not necessarily, cut away as indicated at 15, to provide a bearing to engage a set of washers of felt, fiber, or other material, which washers are positioned on both sides of the arm 17 embracing the vertical member 19, presently to be more particularly described. The washers 16 may be replaced from time to time when worn.

The arm 17 is positioned on the shaft 12, and is equipped with a pair of clamping members embracing the vertical member 19, a screw member 20 equipped with a knurled head being associated with the arm 17 to hold the parts in securing an adjustable relation. As will be obvious, by manipulating the knurled head of the screw member 20, the arm 7 may be adjusted up and down the vertical member 19.

The vertical member 19 is preferably though not necessarily square in cross-section, as shown more particularly in Fig. 7. This construction provides an efficient means whereby the clamping member 18 may be effectively prevented from slipping, due to vibration or shocks. The upper end of the vertical member 19 has integral therewith, or associated therewith in any preferred manner a pin or a set of pins indicated by the numeral 24. Said pin is adapted to engage with wedge-shaped jaws 23 formed in an upper element 21 of the bracket B.

The bracket B comprises preferably a set of elements or devices 21 and 22, the upper element 21 being as just mentioned equipped with wedge-shaped jaws 23 to receive and hold, and prevent vibration of the vertical member 19. The upper element 21 may be made of two pieces, or equipped with a bifurcated portion 25 adapted to embrace any support, such for example as the frame 26 of the windshield of a motor vehicle, a suitable clamping means 27 in the shape of an ordinary screw bolt or other fastening means being used to hold the elements 21 in position.

The lower element 22 of the bracket B has its end 28 constructed precisely the same as the end 25 of the upper element 21, a similar securing device 29 being used, and corresponding with the fastener 27. The other end 30, however, as more particularly shown in Fig. 7, is fashioned in the form of a spring clamp as shown, said clamp being equipped with cut-away portions 31, and a bolt or other fastener 32, provided with a knurled head, if desired, for adjusting purposes, the clamp 30 embracing the lower end of the vertical member 19, securely holding the same in position. This form of clamp has proven very effective in practice. It will be obvious that if desired any other form of clamp and fastening or adjusting means may be substituted for that just described.

In the modified form depicted in Figs. 9, 10, and 11 such a form is shown, wherein the arm 7' is equipped with a preferably circular end piece 9', split as shown, which portions are secured together by means of the screw bolt or other fastening device s', a split fiber sleeve 10' being positioned in the circular cavity of the piece 9' to coact with the projection h' of the complementary member 8' formed on the end of the bar 4' holding the light shield. This construction permits the shield to be swung laterally, the fiber sleeve 10' effectively preventing the parts from becoming loose due to vibration. If desired, the piece 8' may be provided with a screw threaded connection to make the part 4' detachable from the shield.

If desired, the elements 21 and 22 may be connected to form one integral construction, rather than distinct and separate elements. Moreover, the bracket B may be equipped with anchoring pieces provided with means whereby said bracket may be secured to any support, either by means of screws or otherwise. This form of my invention is adapted for especial use in connection with closed cars, where it is impossible to use a bracket equipped with the elements 21 and 22, the anchoring pieces just mentioned being positioned on the frame work of the windshield, at the top and bottom.

It will also be understood that if desired more than one shield 1, equipped with the appliances hereinbefore described, may be used with the bracket B, there being ample room on the vertical member 19 to accommodate said appliances.

The operation of my invention should now be clear. Should any objectionable light rays or glare enter the vehicle, all that is necessary to do to effectively shut out said rays or glare, is to seize the shaft or support 4, or indeed the shield 1, and move the same to the required position. This may be done by moving the shield 1 sideways, up, or down, or at any angle relative to the bracket B, any adjustment needed being made by the adjusting means 20.

To adjust the arm 7 relative to the vertical member 19, the clamping element 18 is used, the adjustment being accomplished by means of the knurled head 20, as just explained. If it is desired to move the shield 1 out of the way, all that it is necessary to do is to grasp the shaft 4, or the shield 1 merely, and swing it upwardly or laterally. Should it be desired to remove the shield entirely from the vehicle, all that is necessary is to unscrew the fastener 32, loosening the clamp 30, after which the shield and vertical member intact may be lifted bodily from the bracket B.

While I have thus described my invention with great particularity, it will be obvious that the same may be modified throughout a wide range. I accordingly do not purpose to be limited to the exact details of construction shown and described, but reserve the right in practice to make any and all modifications thereof that fall within the scope of the appended claims.

I claim as my invention:

1. A non-vision-obstructing antiglare device including a glare screen, a support for said screen extending longitudinally in parallel relation therewith, a set of adjustable clamps for holding said screen to said support, an arm extending from said support, means associated with said arm and said support whereby said screen may be moved relatively to said arm, a U-shaped clamp, means associated with said arm and said clamp whereby said arm may be moved relatively to said clamp, a vertical member upon which said clamp is mounted, a bracket, and means associated with said vertical member whereby said vertical member may be lifted bodily from said bracket.

2. A non-vision-obstructing anti-glare device including a glare screen, a shaft, means axially adjustable on said shaft for connecting the screen thereto, an arm to one end of which said shaft is adjustably connected, a clamp to which the other end of said arm is adjustably secured, a mount for said clamp, means to secure said clamp in position of adjustment upon said mount, a bracket for supporting said mount and mutually engaging means on said mount and bracket to prevent rotation thereof.

3. A non-vision-obstructing anti-glare device including a glare screen, a shaft, means axially adjustable on said shaft for connecting the screen thereto, an arm to which one end of said shaft is adjustably connected, a clamp to which the other end of said arm is adjustably connected, a rod on which said clamp is secured for vertical adjustment relatively thereto, a bracket for supporting the ends and preventing rotation of said rod, a vertically and axially adjustable bracket support, and means for securing said bracket upon said support.

In testimony whereof I have signed my name to this specification.

ARTHUR W. RICHES.